(12) United States Patent
Cho

(10) Patent No.: US 10,604,073 B2
(45) Date of Patent: Mar. 31, 2020

(54) PILLAR DISPLAY SYSTEM FOR BLIND SPOT OF A VEHICLE

(71) Applicants: Hyundai Motor Company, Seoul (KR); Kia Motors Corporation, Seoul (KR)

(72) Inventor: Yong Joo Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 15/786,361

(22) Filed: Oct. 17, 2017

(65) Prior Publication Data

US 2018/0290593 A1 Oct. 11, 2018

(30) Foreign Application Priority Data

Apr. 10, 2017 (KR) .................. 10-2017-0046056

(51) Int. Cl.

| H04N 7/18 | (2006.01) |
|---|---|
| B60R 1/00 | (2006.01) |
| G03B 21/60 | (2014.01) |
| G03B 21/28 | (2006.01) |
| G03B 17/54 | (2006.01) |
| B60R 11/04 | (2006.01) |
| G03B 21/00 | (2006.01) |

(52) U.S. Cl.
CPC ............. *B60R 1/002* (2013.01); *B60R 1/00* (2013.01); *B60R 11/04* (2013.01); *G03B 17/54* (2013.01); *G03B 21/00* (2013.01); *G03B 21/28* (2013.01); *G03B 21/60* (2013.01); *B60R 2300/202* (2013.01); *B60R 2300/602* (2013.01); *B60R 2300/802* (2013.01)

(58) Field of Classification Search
CPC ............. B60R 1/00; B60R 2300/202; B60R 2300/802; B60R 2300/105; B60R 11/00; B60R 2011/0028; B60R 2300/301; B60R 2300/306; B60R 2300/602; B60R 2300/107; B60R 2300/205; B60R 2300/302; B60R 2300/303; B60R 2300/304; B60R 2300/60; B60R 2300/70; B60R 2300/8033
USPC ........................................ 348/148
See application file for complete search history.

(56) References Cited

U.S. PATENT DOCUMENTS 9,126,533 B2 9/2015 Kubota et al.
2016/0191794 A1 6/2016 Varonos
(Continued)

FOREIGN PATENT DOCUMENTS

| JP | 2015-160491 A | 9/2015 |
| KR | 10-2004-0003216 A | 1/2004 |
| KR | 10-1647730 B1 | 8/2016 |

*Primary Examiner* — Masum Billah
(74) *Attorney, Agent, or Firm* — Morgan, Lewis & Bockius LLP

(57) ABSTRACT

A pillar display system for a blind spot of a vehicle may include an A-pillar disposed inside a vehicle; and an image projector projecting a blind spot image of the vehicle taken with a camera, wherein a plurality of virtual ellipsoids are formed by setting an area where a driver's eyes are positioned and the image projector as focuses, and a pattern area formed by a combination of facets of the virtual ellipsoids is disposed at a position where the virtual ellipsoids and the A-pillar meet each other wherein the image from the image projector is displayed on the pattern area.

10 Claims, 5 Drawing Sheets

(56) References Cited

U.S. PATENT DOCUMENTS

2016/0243986 A1\* 8/2016 Ishiguro ................... B60R 1/00
2017/0078653 A1\* 3/2017 Bi ......................... G06T 3/0062

\* cited by examiner

[ Ellipsoid Character ]        [ Application of the Ellipsoid Character ]

PILLAR DISPLAY SYSTEM FOR BLIND SPOT OF A VEHICLE

CROSS-REFERENCE(S) TO RELATED APPLICATIONS

The present application claims priority to Korean Patent Application No. 10-2017-0046056, filed on Apr. 10, 2017, the entire contents of which are incorporated herein for all purposes by this reference.

BACKGROUND OF THE INVENTION

Field of the Invention

The present invention relates to a pillar display system for a blind spot of a vehicle. More particularly, the present invention relates to a pillar display system for a blind spot of a vehicle, the system improving a driving environment for a driver by displaying an image of a blind spot on a pillar, on which a pattern area is formed.

Description of Related Art

In general, a vehicle body that forms the external shape of a vehicle includes a floor panel forming the bottom portion of the vehicle, a frame for maintaining a strength of the vehicle body, pillars disposed at sides of the vehicle body, a roof panel forming a top portion of the vehicle body, and doors.

A driver sees the front area usually through a windshield glass of the vehicle when driving, but he or she sees the rear area or the side rear areas through a rear view mirror or side view mirrors and sees the sides through door windows of the vehicle.

However, pillars of a vehicle may interfere with front and side front visual fields of a driver when he or she drives the vehicle. That is, blind spots are caused at the front and side areas of a vehicle due to the pillars.

As a device for removing blind spots due to the pillars, blind spot mirrors are mounted or attached to a vehicle, but the blind spot mirrors deteriorate the esthetic appearance of vehicles. Furthermore, since the blind spot mirrors are convex mirrors, they deteriorate depth perception of a driver, so the blind spot mirrors cause a side effect instead, which is not preferable in terms of safety.

Furthermore, there is a system that can remove blind spots by taking motion pictures of the front area or the side front areas of a vehicle using cameras on the external sides of pillars and displaying the images through a monitor, but the directions of the images are distorted depending on the eye direction (viewing angle) of the driver, so he or she cannot exactly recognize the external situations. Furthermore, when the vehicle approaches an obstacle, the driver does not have enough time to recognize and cope with the obstacle, so it is difficult for the driver to prevent a collision.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention has been made in an effort to solve the above problems of the conventional art, and an object of the present invention is directed to minimize distortion depending on the viewing angle of a driver by showing an image on a pillar corresponding to a blind spot on the basis of the viewing angle of the driver.

Various aspects of the present invention are directed to providing a blind spot image by forming various patterns on a pillar on the basis of the positions of an image projector and the driver's eyes.

The aspects of the invention are not limited to the described above, and the aspects of the present invention stated herein may be easily understood from the following description and may be made clear by exemplary embodiments of the present invention. Furthermore, the objects of the present invention can be achieved by the components described in claims and combinations thereof.

A pillar display system for a blind spot of a vehicle includes the following configurations.

The pillar display system for a blind spot of a vehicle may include an A-pillar disposed inside a vehicle; and an image projector projecting a blind spot image of the vehicle taken with a camera, in which a plurality of virtual ellipsoids are formed by setting an area where a driver's eyes are positioned and the image projector as focuses and a pattern area is formed by a combination of facets of the virtual ellipsoids disposed at a position where the virtual ellipsoids and the A-pillar meet each other.

The pattern area may be formed in a height direction of the A-pillar.

A number of virtual ellipsoids forming the pattern area may be at least one hundred or more.

The pattern area may be disposed on at least a portion of the A-pillar so that an image from the image projector is reflected from the A-pillar to the driver's eyes.

The pattern area may be formed by a combination of cells including surfaces of the ellipsoids.

The pattern area may be embossed.

Furthermore, a smart pillar display system may include a camera configured for taking a blind spot image of a vehicle; an A-pillar disposed inside a vehicle; and an image projector configured to project image of the vehicle taken with the camera, wherein a plurality of virtual ellipsoids are formed by setting an area where a driver's eyes are positioned and the image projector as focuses, and a pattern area is formed by a combination of facets of the virtual ellipsoids disposed at a position where the virtual ellipsoids and the A-pillar meet each other.

The pattern area may be formed in a height direction of the A-pillar.

The number of ellipsoids forming the pattern area may be at least one hundred or more.

The pattern area may be disposed on at least a portion of the A-pillar wherein an image from the image projector is reflected from the A-pillar to the driver's eyes.

The pattern area may be formed by a combination of cells including surfaces of the ellipsoids.

The pattern area may be embossed.

The present invention may produce the following effects from the exemplary embodiments, and the configurations and combination and use relationships to be described below.

Various aspects of the present invention are directed to providing a blind spot image continuously displayed on a windshield glass and a side glass, so deterioration of a driver's field of view is minimized.

Furthermore, since a blind spot is displayed at the position of a blind spot, the driver can easily recognize the blind spot of a vehicle while driving.

Furthermore, since a plurality of ellipsoids is formed and a pattern area is provided at a position where the ellipsoids and the pillar meet each other, it is possible to provide a clear image throughout the entire pattern area rather than display the blind spot on a portion of the pillar.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
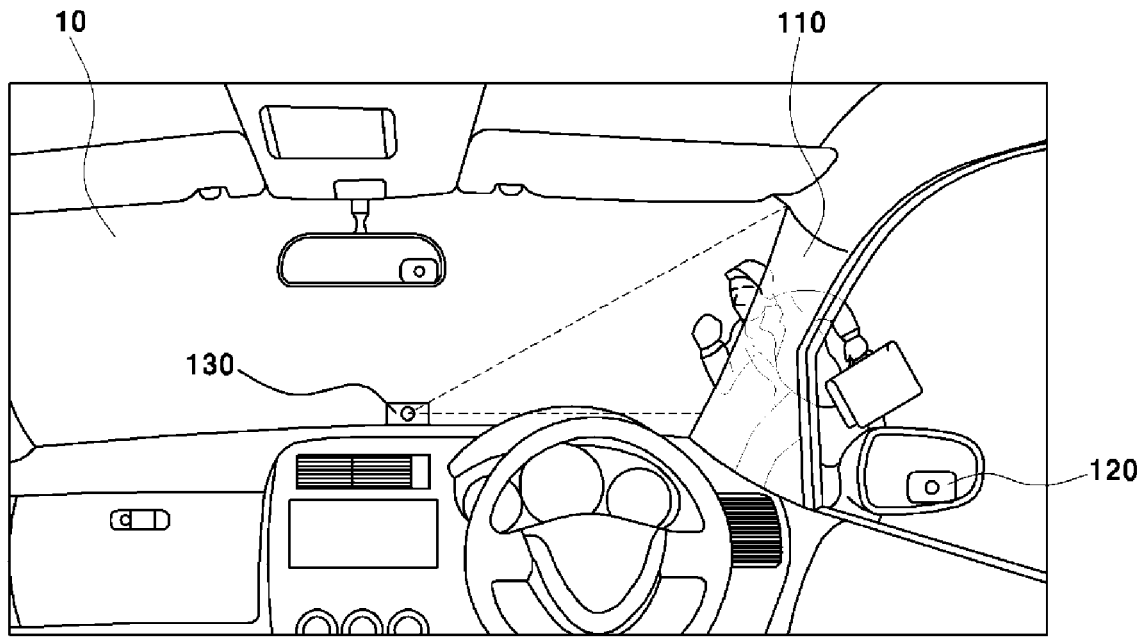
FIG. 1 is a view showing the configuration of a pillar display system for a blind spot of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Furthermore, in the specification, the terms "~unit" mean one device for processing at least one function or operation and may be achieved by a combination of hardware.

Various aspects of the present invention are directed to providing a pillar display system for a blind spot of a vehicle that can display the blind spot of the vehicle. The pillar display system includes one or more pillars 110 (an A-pillar, a B-pillar, and a C-pillar, etc.) that has a pattern area 112 configured to show an image of a blind spot, a camera 120 for taking a blind spot image of the vehicle, and an image projector 130 for showing the blind spot image on the pillar 110 including the pattern area 112.

The image from the camera 120 is configured to be continuously displayed on a windshield glass or a side glass and the compensated image is projected to the pillar 110 via the image projector 130.

FIG. 1 is a view showing a configuration of a pillar display system for a blind spot of a vehicle according to an exemplary embodiment of the present invention.

The pillar display system for a blind spot of a vehicle according to an exemplary embodiment of the present invention, to display the blind spot image on the A-pillar 110, includes the camera 120 disposed on an external of the vehicle to take the image of a blind spot and the image projector 130 showing the image on the A-pillar 110.

The image projector 130 in an exemplary embodiment of the present invention may be disposed approximately around the eyes of a driver, and the image projector 130 may be disposed on a crash pad or a headrest 140 without a package volume limit.

The image projector 130 may be a projector having 50 ANSI lumen or less and can provide a clear blind spot image to the driver via the pillar 110 including the pattern area 112.

As shown in FIG. 1, the blind spot image may be shown on the A-pillar 110 in an exemplary embodiment of the present invention and the pattern area 112 may be provided on at least a portion of the surface of the A-pillar 110. The pattern area 112 is configured to allow an image from the image projector 130 to have a predetermined level of brightness.

The pattern area 112 of the present invention is not limited by the position of the driver's eyes, the surface of the pattern area 112, and an angle of the image projector 130, so the pattern area 112 can use retro reflection (recurrent reflex), but an incident angle of the blind spot image from the image projector 130 is not limited.

Furthermore, the pattern area 112 of the present invention is formed by an ellipsoidal facet, that is, the pattern area 112 is configured by combining a plurality of virtual facets of the virtual ellipsoids on the pillar 110.

The pattern area 112 may be configured to form a pattern on surfaces of virtual ellipsoids at positions where the virtual ellipsoids and the pillar 110 meet each other. The pattern area 112 may include elliptical patterns that are formed on the A-pillar 110 by virtual ellipsoids in an exemplary embodiment of the present invention. Furthermore, cell-leveled elliptical surfaces can be formed at the positions where ellipsoids and the A-pillar 110 meet each other, wherein the pattern area 112 may be configured by combining a plurality of cells including portions of ellipsoidal surfaces.

Furthermore, it is possible to show a clear image throughout the area of the pattern area 112 disposed at a predetermined area rather than making a hot spot of which only a portion is bright through the pattern area 112.

Furthermore, the pattern area 112 of the present invention disperses a reflected image throughout the area including the driver's eyes, wherein the reflected area can be shown throughout the headrest 140 by the pattern area 112.

The pattern area 112 of the present invention is formed by ellipsoids formed by setting the headrest 140 where the driver's eyes are positioned and the image projector 130 as focuses, so the pattern area 112 may be formed by a combination of patterns formed on ellipsoidal surfaces at the positions where the ellipsoids and the A-pillar 110 meet each other.

The pattern area 112 may be positioned at a predetermined height in consideration of the position of the image projector 130 and the driver's sitting height, wherein the pattern area 112 may be formed at a portion in the height direction of the A-pillar 110.

At least one hundred of ellipsoids, formed by setting the position of the driver's eyes (the position of the headrest 140) and the image projector 130 as focuses, are required to form the pattern area 112 on the A-pillar 110.

Hundreds to millions of ellipsoids may be provided to form the pattern area 112. The larger the number of ellipsoids utilized for forming the pattern area 112, the denser the pattern can be achieved.

Figure 2:
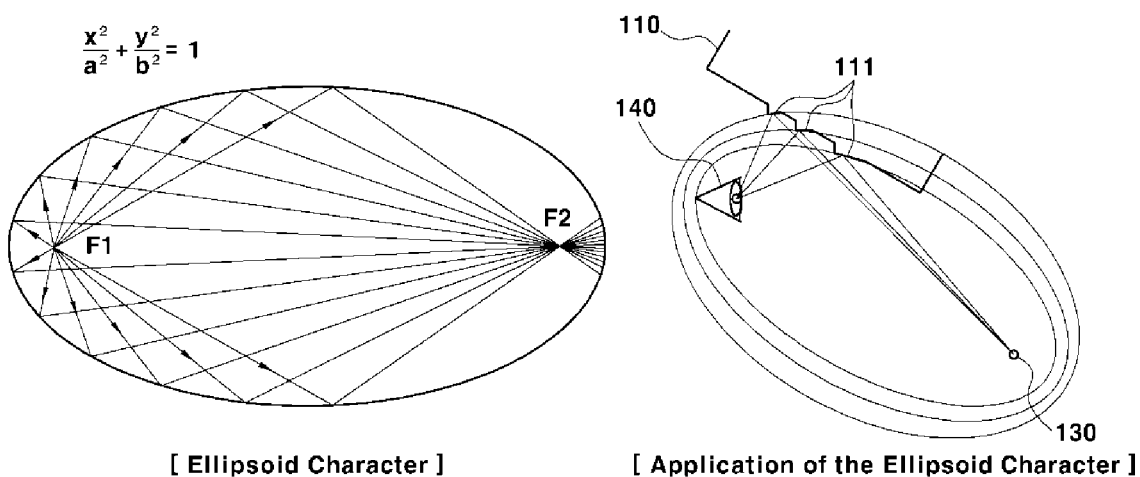
FIG. 2 is a view showing ellipsoids constructed by the pillar display system for a blind spot of a vehicle according to an exemplary embodiment of the present invention.

FIG. 2 shows an ellipsoid for forming the pattern area 112 of the pillar display system for a blind spot of a vehicle of the present invention.

As shown in FIG. 2, the ellipsoid is formed by setting the focuses that are a position F1 of the image projector 130 and a position F2 of the driver's eyes. At least hundreds of ellipsoids may be formed.

It is possible to form the pattern area 112 including elliptical patterns formed on the surfaces of 3D ellipsoids at positions where the ellipsoids and the A-pillar 110 meet each other.

Predetermined projective surfaces 111 are formed on the surfaces of the ellipsoids at the positions where the ellipsoids and the surface of the A-pillar 110 meet each other. Projective surfaces 111 which extend along tangential lines of the ellipsoids may be formed at the positions where the ellipsoids and the A-pillar 110 meet each other.

The projective surfaces 111, formed at the positions where the A-pillar 110 and the ellipsoids meet each other, protrude at a predetermined height outward from the surface of the A-pillar 110 along the elliptical surfaces of the ellipses, wherein the image from the image projector 130 is reflected from the pattern area 112 on the A-pillar 110 to the driver's eyes.

According to another exemplary embodiment of the present invention, a cell can be achieved from an ellipse, wherein an embossed pattern area 112 can be achieved by combining the cells formed along the ellipsoids.

The embossed pattern area 112 is includes ellipsoidal surfaces having the same height as the A-pillar 110, wherein a pattering area 112 having substantially a same height as the A-pillar 110 not having a pattern area 112 can be achieved.

Figure 3:
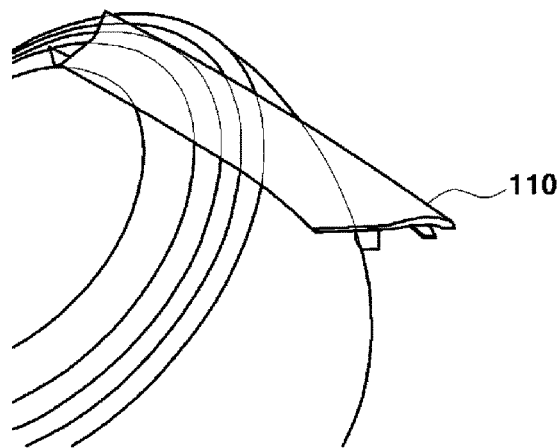
FIG. 3 is a view showing the configuration of a pattern area of the pillar display system for a blind spot of a vehicle according to an exemplary embodiment of the present invention.

FIG. 3 shows an exemplary embodiment of the present invention, in which the plurality of ellipsoids is formed and the pattern area 112 is formed in the height direction of the A-pillar 110 facing the ellipsoid.

According to an exemplary embodiment of the present invention, the pattern area 112 is formed in consideration of the positions of the driver's eyes, that is, the pattern area 112 is formed at a predetermined portion in the height direction of the A-pillar 110.

That is, the positional range of the driver's eyes is determined and virtual ellipsoids are formed by setting the image projector 130 and the positions of the driver's eyes as focuses to form the pattern area 112. It is possible to achieve the pattern area 112 on a plurality of ellipsoidal surfaces in the height direction of the A-pillar 110 from the ellipsoids.

Furthermore, since the image projector 130 can be moved up and down at predetermined angles, and the pattern area 112 may be formed in the height direction of the A-pillar 110, the display system is configured to be able to reflect all images from the image projector 130.

Furthermore, the image from the image projector 130 may be reflected from the pattern area 112 to the driver's eyes, that is, the reflected image can be dispersed to a predetermined area in consideration of the driver's sitting height and/or left and right visual differences.

Accordingly, it is possible to show a dispersed image in consideration of individual differences including the sitting height and the left/right biased posture of the driver, and a dispersed image can be shown in the area where the headrest 140 is positioned from the image reflected from the pattern area 112.

Figure 4:
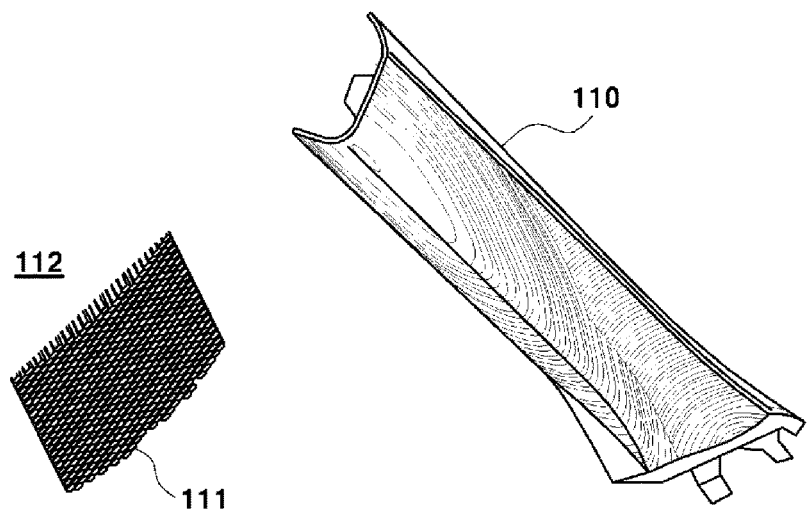
FIG. 4 is a perspective view showing a pillar including the pattern area of the pillar display system for a blind spot of a vehicle according to an exemplary embodiment of the present invention.

FIG. 4 shows an exemplary embodiment of the present invention, in which the pattern area 112 is formed on the A-pillar 110 at a position where the pattern area 112 is in contact with the ellipsoid formed on the basis of the position of the driver's eyes and the image projector 130.

As shown in FIG. 4, the plurality of ellipsoids is formed on the basis of the position of the driver's eyes and the position of the image projector 130, and patterns are formed along ellipsoidal surfaces at the positions meeting the virtual ellipsoids on the internal side of the A-pillar 110.

That is, the plurality of ellipsoids formed in the height direction and the A-pillar 110 face each other, and the pattern area 112 is formed at positions where the ellipsoids and the A-pillar 110 meet each other.

The pattern area 112 may be formed in the shape of a projective surface where the virtual ellipsoids are in contact with the A-pillar 110, and may have patterns formed along the ellipsoidal surfaces of the virtual ellipsoids on the internal side of the A-pillar 110.

As described above, the pattern area 112 may be formed on the side of the A-pillar 110 that faces the internal of the vehicle and may be formed along the ellipsoidal surfaces at positions meeting the virtual ellipsoids. The pattern area 112 may be embossed by a combination of the cells formed at the positions meeting the virtual ellipsoids.

Figure 5:
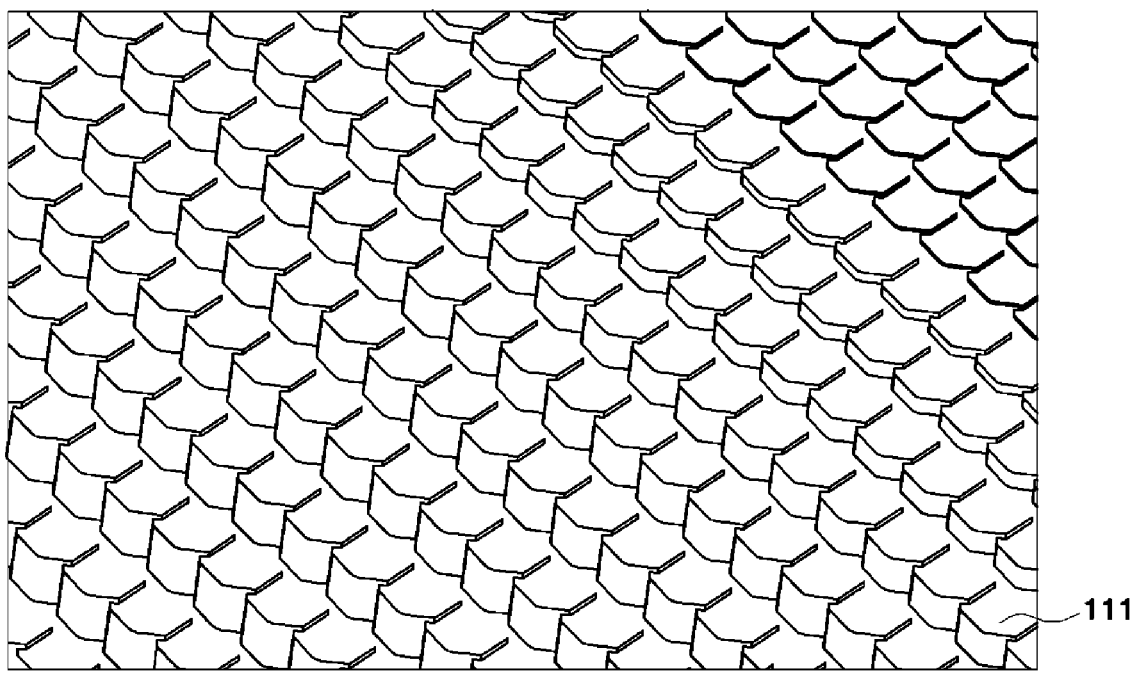
FIG. 5 is a view showing the pattern area of the pillar display system for a blind spot of a vehicle according to an exemplary embodiment of the present invention.

FIG. 5 shows the pattern area 112 of the present invention, in which the pattern area 112 is embossed.

The pattern area 112 of the present invention forms virtual ellipsoids formed by setting the position of the driver's eyes and the image projector 130 as focuses, and is formed at the positions where the virtual ellipsoid and the pillar 110 meet each other.

The projective surfaces 111 are formed along ellipsoidal surfaces at positions where the virtual ellipsoids and the pillar 110 meet each other, and the pattern area 112 may have the plurality of elliptical patterns on the surface of the pillar 110.

Another exemplary embodiment of the present invention, as shown in FIG. 5, includes cells formed along ellipsoidal surfaces where virtual ellipsoids and the pillar 110 meet each other and the embossed pattern area 112 can be achieved by a combination of the cells formed along the ellipsoids.

As described above, it is possible to achieve the embossed pattern area 112 from a combination of the projective surfaces 111 or the cells formed by virtual ellipsoids having the position of the driver's eyes and the image projector 130 as focuses.

Figure 6:
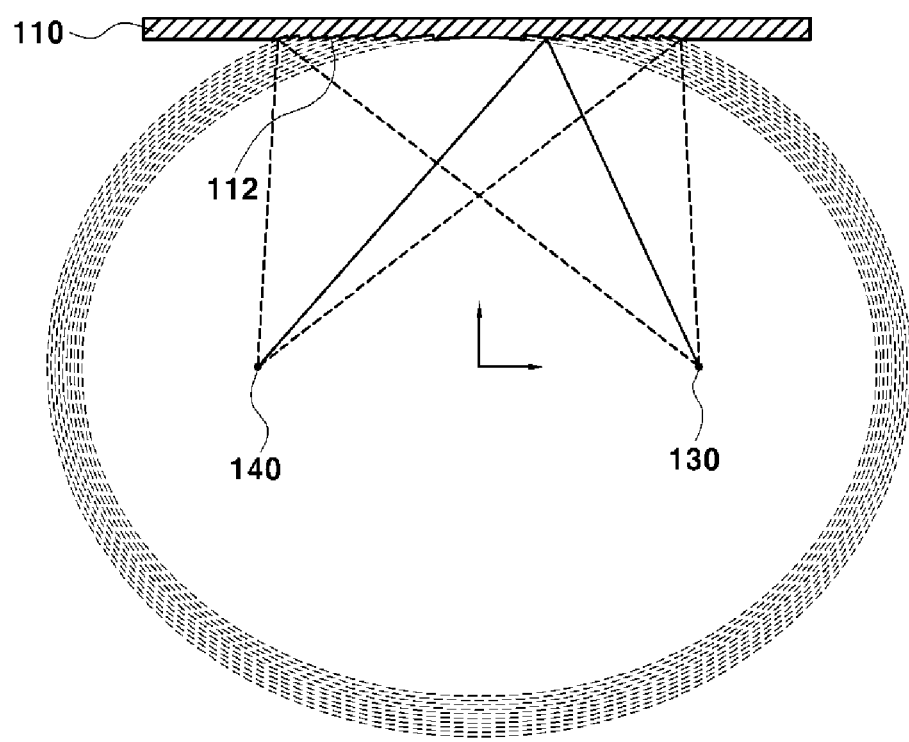
FIG. 6 is cross-sectional view of the pillar display system for a blind spot of a vehicle according to an exemplary embodiment of the present invention.

FIG. 6 is a cross-sectional view of the pattern area 112 formed by virtual ellipsoids of the present invention.

As shown in FIG. 6, virtual ellipsoids are formed by setting the positions of the driver's eyes and the image projector 130 as focuses, and a pattern area 112 protruding along the ellipsoidal surfaces of the ellipsoids is formed at positions where the ellipsoids and the internal side of the pillar 110 meet each other.

In an exemplary embodiment of the present invention, a plurality of ellipsoids having different sizes and the same focuses are included.

Accordingly, in a cross-section of the pillar 110, the pattern area 112 forming patterns on ellipsoidal surfaces is formed at a position where the plurality of ellipsoids and the pillar 110 meet each other. Furthermore, cells can be formed along ellipsoidal surfaces where the ellipsoids and the pillar 110 meet each other, wherein the pattern area 112 can be embossed by a combination of cells formed along the ellipsoids.

Figure 7:
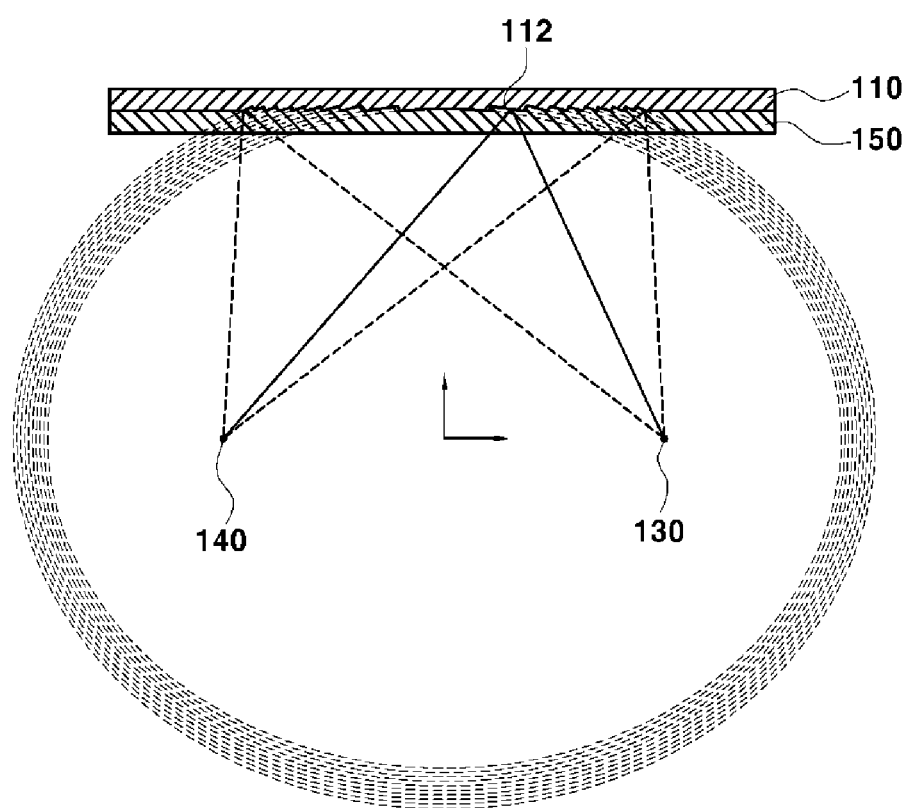
FIG. 7 is cross-sectional view of a pillar including a transparent layer of the pillar display system for a blind spot of a vehicle according to an exemplary embodiment of the present invention.

FIG. 7 is a cross-sectional view showing the pillar 110 including a transparent layer 150 according to an exemplary embodiment of the present invention.

The transparent layer 150 is disposed on the pattern area 112 and configured to protect the pattern area 112 on the pillar 110, preventing distortion of the image projected from the image projector 130.

Transparent polymeric resin is used for coating the transparent layer 150 and for protecting and showing the surface of the pillar 110, but the present invention is not limited to the above properties as long as the material is transparent. For example, thermoplastic resin including acryl-based resin, epoxy-based resin, and urethane-based resin, thermosetting resin, and UV hardening resin all can be configured. Furthermore, silicon-based rubber and other silicon resin, other than pure organic polymeric resins, can also be used.

In general, it may be possible to blend acryl-based resin and urethane-based resin at a predetermined ratio to prevent curing due to the difference between the thermal expansion coefficients of the base material and the resin during hardening, and to secure thermal resistance, humidity resistance, and flexibility of the material.

Figure 8:
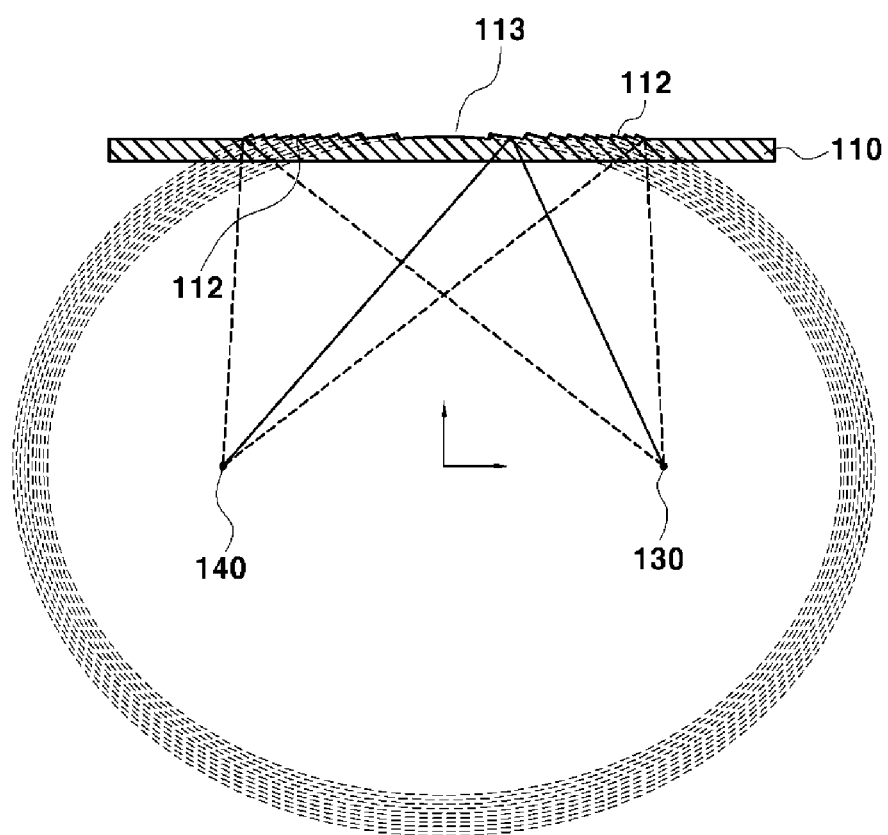
FIG. 8 is cross-sectional view of a pattern area inside a pillar of a pillar display system for a blind spot of a vehicle according to another exemplary embodiment of the present invention.

FIG. 8 is a view showing a cross-section of the pillar 110 including a transparent material according to another exemplary embodiment of the present invention, in which a reflective coating layer 113 is formed on the internal side, which faces the frame of a vehicle, of the pillar 110 and configured to reflect the image projected from the image projector 130.

As shown in FIG. 8, according to another exemplary embodiment of the present invention, the pillar 110 includes a transparent material and a pattern area 112 protruding along virtual ellipsoids is formed on the internal side, which faces the frame of a vehicle, of the pillar 110 by setting the position of the driver's eyes and the image projector 130 as focuses.

Furthermore, the reflective coating layer 113 is formed on the internal side of the pillar 110 where the pattern area 112 is positioned, wherein the image from the image projector 130 passes through the pillar 110 and is reflected by the reflective coating layer 113 on the internal side of the pillar 110 to the driver's eyes.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pillar display system for a blind spot of a vehicle, the system comprising:
   an A-pillar disposed inside the vehicle; and
   an image projector projecting a blind spot image of the vehicle taken with a camera,
   wherein a plurality of virtual ellipsoids are formed by setting a predetermined area where a driver's eyes are disposed and the image projector as focuses, and a pattern area formed by a combination of facets of the virtual ellipsoids is disposed at a position where the virtual ellipsoids and the A-pillar meet each other and wherein an image from the image projector is displayed on the pattern area,
   wherein the pattern area is disposed on at least a portion of the A-pillar, and
   wherein the image from the image projector is reflected from the A-pillar to the driver's eyes.

2. The pillar display system of claim 1, wherein the pattern area is formed in a height direction of the A-pillar.

3. The pillar display system of claim 1, wherein a number of virtual ellipsoids forming the pattern area are at least one hundred or more.

4. The pillar display system of claim 1, wherein the pattern area is formed by a combination of cells including surfaces of the ellipsoids.

5. The pillar display system of claim 1, wherein the pattern area is embossed.

6. A pillar display system comprising:
   a camera for taking a blind spot image of a vehicle;
   an A-pillar disposed inside the vehicle; and
   an image projector projecting an image of an external of the vehicle taken with the camera,
   wherein a plurality of virtual ellipsoids are formed by setting a predetermined area where a driver's eyes are disposed and the image projector as focuses, and a pattern area formed by a combination of facets of the virtual ellipsoids is disposed at a position where the virtual ellipsoids and the A-pillar meet each other and wherein the image from the image projector is displayed on the pattern area,
   wherein the pattern area is disposed on at least a portion of the A-pillar, and
   wherein the image from the image projector is reflected from the A-pillar to the driver's eyes.

7. The pillar display system of claim 6, wherein the pattern area is formed in a height direction of the A-pillar.

8. The pillar display system of claim 6, wherein a number of ellipsoids forming the pattern area are at least one hundred or more.

9. The pillar display system of claim 6, wherein the pattern area is formed by a combination of cells including surfaces of the ellipsoids.

10. The pillar display system of claim 6, wherein the pattern area is embossed.

* * * * *